United States Patent [19]

Mangels et al.

[11] Patent Number: 4,765,541

[45] Date of Patent: Aug. 23, 1988

[54] DRIP EMITTER HOUSING

[75] Inventors: Richard J. Mangels, Victoria; Rex B. Candy, Back Wombat Road, Boisdale, Victoria, 3860, Victoria, both of Australia

[73] Assignees: Rex B. Candy; Jennifer J. Candy, both of Victoria, Australia

[21] Appl. No.: 890,723

[22] Filed: Jul. 30, 1986

[30] Foreign Application Priority Data

Jul. 30, 1985 [AU] Australia .............. PH01703/85

[51] Int. Cl.⁴ .............................................. B05B 15/06
[52] U.S. Cl. .................................. 239/201; 239/288; 239/542; 405/40
[58] Field of Search ............... 239/200, 201, 542, 600, 239/288, 288.3, 288.5; 405/39, 40, 48, 36, 37; 47/48.5

[56] References Cited

U.S. PATENT DOCUMENTS

| | | | |
|---|---|---|---|
| 419,242 | 1/1896 | Brown | 405/39 |
| 1,078,635 | 11/1913 | Naylor | 405/43 |
| 1,333,296 | 3/1920 | Eichenfeld | 405/43 |
| 2,798,768 | 7/1957 | Babin | 405/45 |
| 3,021,078 | 2/1962 | Nickell | 239/201 |
| 4,108,439 | 8/1978 | McGuire | 239/201 |
| 4,153,380 | 5/1979 | Hartman | 405/39 |
| 4,188,154 | 2/1980 | Izatt | 405/43 |
| 4,350,296 | 9/1982 | Kulman | 239/201 |

Primary Examiner—Andres Kashnikow
Assistant Examiner—Kevin P. Weldon
Attorney, Agent, or Firm—Finnegan, Henderson, Farabow, Garrett and Dunner

[57] ABSTRACT

A housing for use with a drip irrigation emitter whereby the emitter can be disposed in the housing underground. The housing comprises a tubular body open at one end which is selectively closable by a cover, the other end of the interior defined by the tubular body comprising a wall having restricted openings therethrough to restrict ingress of soil and other matter to the interior but to allow water out. The tubular body has on its exterior surface a flange which stabilizes the housing in use and prevents the tubular body from being accidentally pulled from the ground. Buttresses may be provided to reinforce the flange and to prevent twisting of the tubular body in the soil. The drip emitter is preferably supported in the interior clear of the bottom of the tubular body.

6 Claims, 4 Drawing Sheets

DRIP EMITTER HOUSING

The present invention relates to drip irrigation emitters and is particularly concerned with such drip emitters which are intended to be disposed underground.

Drip irrigation emitters are well known devices of various mechanical construction which are intended to provide localised watering of flora. To this end, a drip emitter is connected to a source of water and essentially comprises a restrictive valve which provides a controlled slow rate of emission. The size of drip emitter selected for any one location, and more particularly its throughput capability, depends upon the flower, vegetable, shrub or tree to be watered. It is known to locate drip emitters on the surface of the ground, and this is particularly useful in household arrangements, but, for example, where a drip emitter is intended to provide water to a tree disposed in an expanse of grass which is to be cut regularly it is more convenient to locate the drip emitter underground. Locating the drip emitters underground may also minimize accidental and particularly vandal damage.

A substantial problem with underground drip emitters is that they must be regularly checked to ensure that they are working satisfactorily and have not become blocked by the surrounding mud, and this presents the problem of tracing any one drip emitter when there may be no above ground indication of its location and, even if there is some such indication, the drip emitter may have migrated from its original position due to its watering action solubilizing the surrounding mud. A still further problem is that roots of the flora being watered by the drip emitter tend to be attracted to sources of water and may block the drip emitter outlet.

One proposal which has been made to alleviate some of these difficulties is described in U.S. Pat. No. 4,350,296 which proposes a protective sleeve which is buried underground and which receives the emitter. A cap is provided for access to the emitter. The emitter is rigidly supported on a water supply line which extends through or immediately beneath the sleeve so that migration of the sleeve is intended to be prevented by the water supply line. This produces the major disadvantage that should a vehicle, for example, be driven over the sleeve so as to force the sleeve downwardly, the water supply line may be severed or become disengaged from the emitter. The U.S. Patent also proposes water distribution tubing extending from the emitter to the desired watering location and this presents the same problem intended to be overcome by the sleeve of the water outlet becoming clogged due to backflow of mud after completion of an irrigation cycle and root growth. This problem cannot be resolved by simply removing the distribution tubing since root growth and ingress of soil would then readily occur within the sleeve.

It is an object of the present invention to alleviate the aforementioned difficulties.

According to the present invention there is provided a housing for use with a drip emitter and adapted to be disposed underground, said housing comprising a tubular body defining a hollow interior capable of receiving a drip emitter, the tubular body being open at one end to provide access to the hollow interior and said hollow interior having an end remote from said one end of the body defined by a wall having a plurality of restricted openings therethrough to restrict ingress of exterior matter to the hollow interior when the housing is disposed underground and to allow ingress from the hollow interior of water emitted by the drip emitter, the tubular body having on its exterior surface at a position remote from said one end generally transversely outwardly extending flange means to stabilise the housing when it is disposed underground, and the housing including a removable cover engageable with the tubular body at said one end for selectively closing said one end.

Further according to the present invention there is provided a drip emitter assembly comprising a housing substantially as described in the immediately preceding paragraph in combination with a drip emitter disposed within the hollow interior and a water supply line communicating with the drip emitter and adapted for connection to a source of water.

By the present invention, the housing may be disposed underground with the cover at or just below ground level. The flange means, for example an annular flange, of the housing is intended to stabilise the housing and particularly to resist downwards migration and tilting of the housing due to the dampness of the soil beneath it caused by water from the drip emitter. The flange means is also designed to prevent the housing being accidentally or otherwise pulled from the ground. Furthermore, the restricted openings in the bottom wall of the hollow interior may alleviate ingress of soil and other matter likely to block the emitter as well as root growth inside the hollow interior.

The bottom wall of the hollow interior, with the restricted openings therethrough, may be disposed adjacent the lower end of the tubular body, so as to sit on the soil, without serious disadvantage because the restricted openings resist entry of extraneous matter to the hollow interior. Alternatively, the bottom wall of the hollow interior may be remote from the bottom of the housing.

Particularly where the bottom wall of the hollow interior is coincident with the bottom of the housing, it may be advantageous to support the drip emitter within the hollow interior remote from the bottom wall so as to give further protection against ingress of extraneous matter, including plant roots, and suitable support means is conveniently provided in the hollow interior. In one embodiment, the support means may be provided on the cover so that when the cover is opened or removed from the tubular body the drip emitter is readily accessible and preferably also visible. Such an arrangement avoids the necessity of a person checking the emitter having to locate the emitter in the bottom of the hollow interior with an inherent risk of being bitten by insects or other animals resident within the housing. A similar advantage is provided where the drip emitter is supported by other means within the hollow interior and in one preferred embodiment the water supply line is in the form of a self-supporting preferably flexible coil which is capable of providing the desired support for the drip emitter. This arrangement may be combined with the drip emitter being supported from the cover so that the drip emitter is readily withdrawable from the hollow interior without disconnecting the water supply line.

The cover may be of a simple push on type or may be hinged to the body, conveniently with some simple securing arrangement but most preferably with means to lock it to the body. The cover need not totally close the upper end of the body since it may have a mesh like or foraminous construction. The housing may in some uses be disposed wholly underground so that the cover is also covered by soil. If the housing, or at least the cap, is formed from metal it may readily be found with a metal detector. Alternatively if the housing is moulded in plastics material such as PVC, the cap may have a metal insert to facilitate its ready location. Should the cap be intended to be located at ground level, it may be covered with synthetic grass or other suitable material to simulate its environment.

The water supply line of the drip emitter assembly of the present invention may be integrally formed with the housing and provide a rigid or flexible connection with the drip emitter as well as communication of the drip emitter with a water source which would be connected to the water supply line externally of the housing. Alternatively, the water supply line may comprise a separate supply tube, which is preferably flexible as, for example, the aforementioned self-supporting coil, and which may enter the hollow interior of the housing through an end of the tubular body or through an aperture or suitable fitting in the wall of the housing. Most preferably the separate supply tube is disposed wholly within the hollow interior and is connected with a water supply connector extending through the material of the tubular body. On the exterior of the tubular body the connector is in use connected to a supply of water such as a reduced pressure mains supply pipe.

The bottom wall of the hollow interior may be defined by a mesh screen across the tubular body, but more preferably it is formed by an integral rigid wall having a plurality of the openings therethrough. The openings are conveniently of restricted width, at least, and may be of irregular shape. The advantage of a rigid wall is that it is more likely to have sufficient strength to withstand the root growth and to resist forces applied due to any displacement of the housing. In addition to the openings in the wall, slots are conveniently provided in the tubular body adjacent the bottom wall, preferably within the hollow interior. Such slots may facilitate egress of excess water from the drip emitter and should be sufficiently narrow to prevent root and soil ingress. A width up to about 2 mm is envisaged for the slots but this may depend upon the roots of the plant being watered, soil type and so forth.

As noted previously, the flange means is preferably an annular flange and conveniently is disposed around the bottom of the tubular body. Advantageously, buttresses may be provided between the flange means and the tubular body to resist upward tilting movement of the flange means if the housing is forced downwardly through the soil for any reason, and to resist twisting of the tubular body.

One embodiment of drip emitter assembly in accordance with the present invention and a modification thereto will now be described by way of example only with reference to the accompanying drawings in which.

Similar or the same items described hereinafter with reference to the drawings will be given the same reference numeral in FIG. 1 and in the modification thereto but with a "'" to designate the modification.

Figure 1:
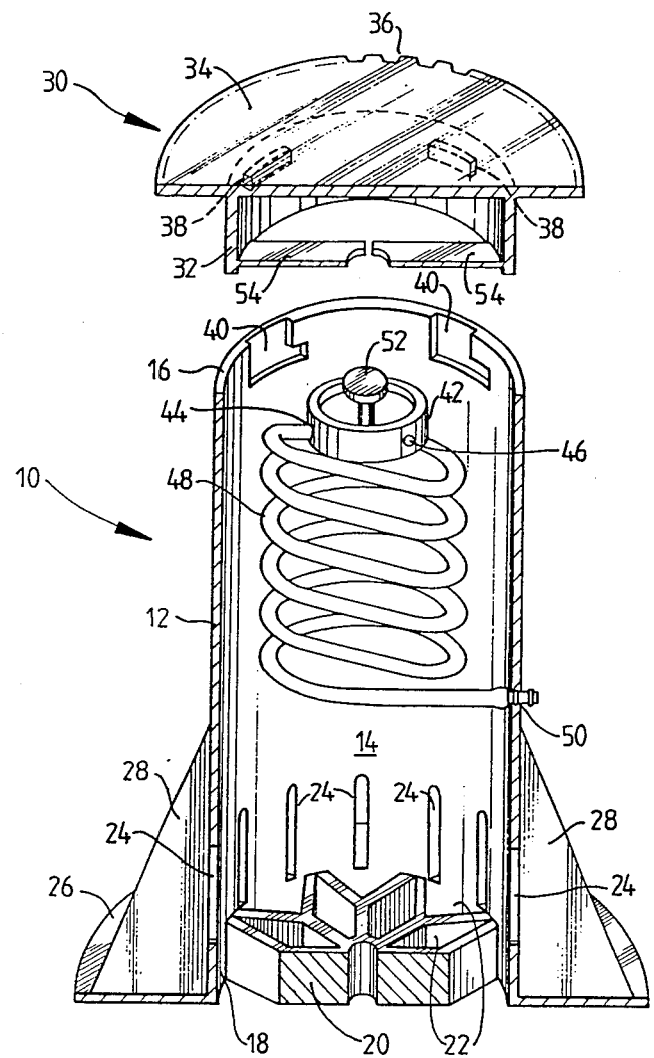
FIG. 1 is a cut away perspective view of the drip emitter assembly.

The drip emitter assembly illustrated in FIG. 1 includes a housing 10 which comprises a cylindrical body 12 defining a hollow interior 14 having an upper end 16 and a lower end 18 which coincide with the upper and lower end of the body 12 respectively.

The upper end 16 of the body 12 is open to provide access to the hollow interior 14, but the lower end 18 is partially closed by a bottom wall 20 which extends across the full cross-sectional area of the hollow interior 14. The bottom wall 20 includes a plurality of openings 22 therethrough from the hollow interior to the exterior of the housing, the openings being of reduced and irregular size. Differently shaped and sized openings may be envisaged. The openings 22 are provided to permit egress of water from the hollow interior 14 but are of reduced size to resist entry of soil and roots from the exterior. The root tips of a plant tend to migrate to a source of water and it is important to minimise their entry to the hollow interior. This purpose is facilitated by the depth of the bottom wall 20.

A plurality of longitudinally extending slots 24 are provided in the cylindrical body 12 adjacent the bottom wall 20 to also facilitate egress of water from the hollow interior. The slots 24 are preferably sufficiently narrow to resist entry of root tips and soil.

Also at the lower end 18 of the housing, there is provided a radially outwardly extending annular flange 26. The flange 26 extends fully around the cylindrical body 12 and stabilises the housing against downwards migration in the soil and against tilting when the soil is moistened. Furthermore, the flange may prevent the housing being pulled from the ground accidentally, for example when a cover is removed, or by vandals. In order to remove the housing it will be necessary to dig it out which will also enable the source of water to be disengaged from the water supply pipe in the housing. Rigidity of the flange 26 is increased by a plurality of buttresses 28 (two only shown) of triangular shape which extend between the uppe surface of the flange and the external surface of the cylindrical body 12. The buttresses will also resist twisting of the tubular body in the soil such as might occur when the cap is removed and which might lead to accidental disengagement of the water supply pipe from the source of water.

A removable cover 30 is provided to close off the upper end 16 of the cylindrical body 12 and comprises an annular insert portion 32, which in use is located within the cylindrical body 12, and an overlying circular disc portion 34. The diameter of the disc portion 34 is somewhat greater than that of the insert portion 32 and the outer radial edge 36 of the disc portion is notched along part or all of its length so as to facilitate manual gripping. A plurality of securing lugs 38 (two only shown) are provided on the radially outer surface of the insert portion 32 to engage a corresponding number of L-shaped grooves 40 provided in the interior surface of the cylindrical body 12 at the upper end. Thus, the insert portion 32 is introduced into the cylindrical body 12 with the lugs 38 cooperating with the vertical legs of the grooves 40, and when the lugs 38 engage the bottom of the groove 40, the cover 30 is rotated clockwise in the drawings so that the lugs 38 engage the horizontal legs of the grooves 40 to secure the cover on the cylindrical body 12.

As shown in FIG. 1, a drip irrigation emitter 42 is disposed in the hollow interior 14 of the cylindrical body. The drip emitter is illustrated schematically and will not be described further since such items are well known and any suitable type may be utilized in the assembly of the present invention. The drip emitter 42 essentially has an inlet 44 and an outlet 46 with water flow restriction means (not shown) being provided in between. The drip emitter inlet 44 is connected to a water supply line 48 which is commonly of 4 mm rubber or synthetic plastics tubing. The opposite end of the supply line 48 is coupled with a connector 50 which extends through the material of the cylindrical body 12 and is itself in use connected to a supply of water, preferably at low pressure. In a preferred embodiment, the tubing 48 is formed into a flexible coil (as shown) which is self-supporting so as to support the emitter 42 remote from the bottom wall of the hollow interior 14. This restricts access of soil and roots to the drip emitter 42, particularly as the sub-soil roots of most plants do not grow aggressively in air.

For convenience, the drip emitter 42 may be supported by the cover 30, in addition to the self-supporting function of the coiled tubing 48 if this is provided. For this purpose, the drip emitter is provided with a peg 52 which is locatable between support elements 54 of the cover. Alternative support arrangements between the drip emitter 42 and cover 30 may be readily envisaged. By connection with the cover, the drip emitter 42 is readily accessible when the cover is removed, although it must be remembered that the water supply line 48 must have sufficient length or flexibility to permit this relative displacement of the emitter.

The cover 30 and cylindrical body 12 are conveniently respectively injection moulded in suitable plastics material such as polyvinyl chloride, with the cylindrical body, being integrally moulded with the flange 26, buttresses 28, bottom wall 20 and, optionally, the connector 50.

In use, the cylindrical body 12 is disposed below ground level along a vertical axis with the cover 30 preferably at ground level, by digging a suitable hole and backfilling of the hole around the cylindrical body. Prior to filling the hole, the connector 50 should be connected to a supply of water with sufficient flexibility in the supply to allow for movement in the soil of the housing. Water emitted by the drip emitter drips down to the bottom wall 20 and flows out of the housing. In clay, there may be a slight build up of water within the hollow interior 14 and the slots 24 alleviate this. Clay soils have a low water permeability and the area wetted by the assembly in time takes up a bulb or onion shape in vertical section. Depending upon the soil permeability and the watering requirements, the housing 10 may need to be installed in some sand to aid the penetration of water to the plant root zone. In sandy soils which are highly permeable, the water may flow almost vertically downwards taking up a carrot shape and the housing may need to be installed onto some clay or plastic to encourage the spread of water to plant root zones in these circumstances. Partially depending upon the permitted flow rate of the drip irrigation emitter, the cylindrical body 12 may need to be of different sizes. It is believed that a minimum practical diameter is in the range of 35 to 40 mm. The length of the housing may also need to be varied to suit soil type and plant water requirements. A housing of a particular length, for example 100 mm, may be stable in some soils but not in others where a length up to 2γ times or more greater may be advantageous.

Figure 2:
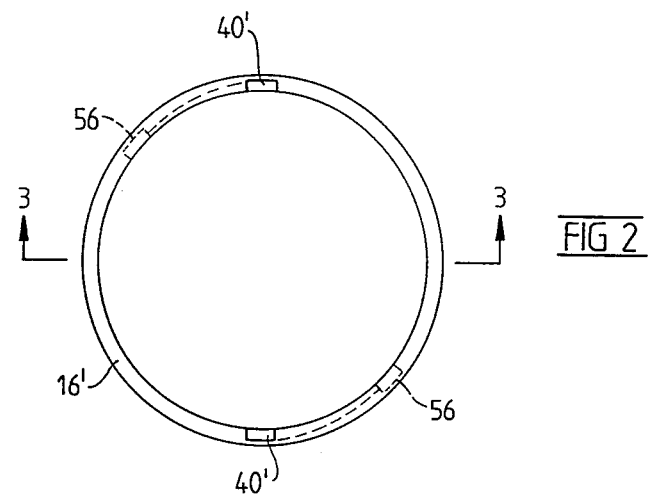
FIG. 2 is a plan view of a modified upper end of the tubular body shown in FIG. 1.
Figure 3:
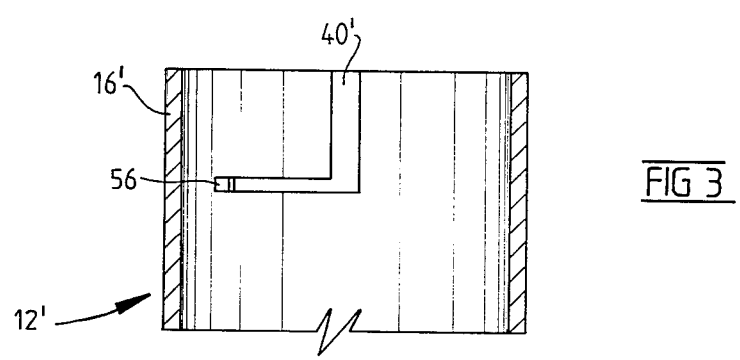
FIG. 3 is a partial sectional view taken on line 3—3 of FIG. 2 but showing only the upper end of the tubular body.
Figure 4:
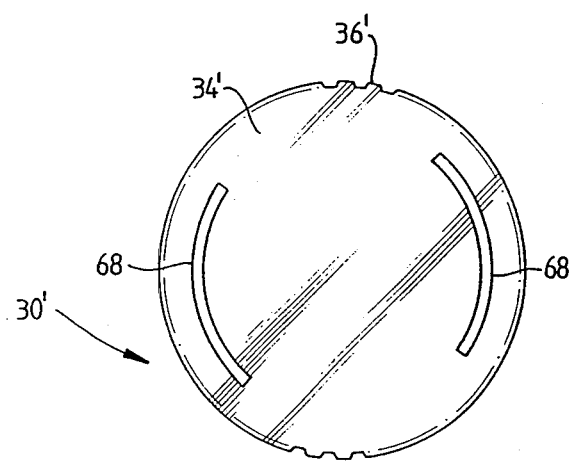
FIG. 4 is a plan view of a modified cover for use with the upper end shown in FIGS. 2 and 3.
Figure 5:
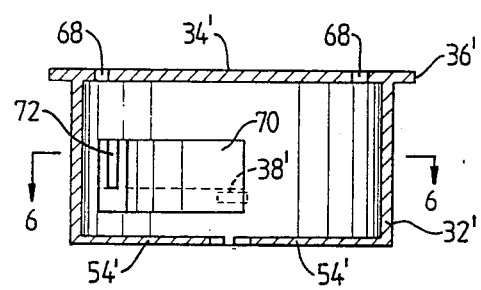
FIG. 5 is a sectional side view of the cover of FIG. 4.
Figure 6:
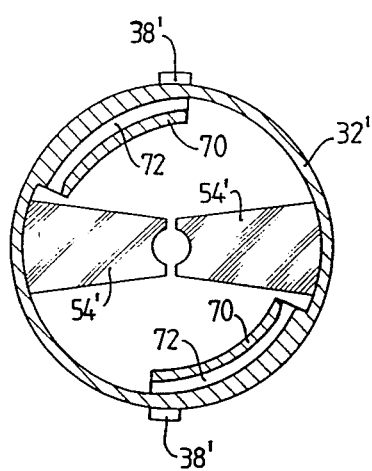
FIG. 6 is a sectional plan view taken on line 6—6 of FIG. 5.

Turning now to FIGS. 2 to 9, a modified arrangement of the housing 10 is shown in which a modified cover 30' illustrated in FIGS. 4 to 6 is lockable to a modified cylindrical body upper end 16'.

Referring firstly to FIGS. 2 and 3, two L-shaped securing grooves 40' are provided in the interior surface of the cylindrical body 12' at the upper end 16'. The vertical leg of the grooves 40' are of constant depth but the horizontal legs are of reducing depth with increased distance from the vertical legs. The depth of the horizontal legs tapers off gradually to a relatively shallow depth and this provides an advantage that soil embedding in the groove may be readily scraped off by displacement along the horizontal legs. At the remote end of the horizontal legs, a recess 56 of depth similar to that of the vertical legs is provided. In this arrangement each horizontal leg extends anticlockwise from the respective vertical leg.

Turning now to FIGS. 4 and 6, the cover 30' has an insert portion 32' and a disc portion 34' with a notched edge 36'. Also provided are members 54' to optionally support the drip emitter 42. On the exterior surface of the insert portion 32' lugs 38' are provided which are a close fit in the vertical legs of respective grooves 40'. Thus, the cover 30' is introduced into the hollow portion of the cylindrical body 12' with the lugs 38' engaging the grooves 40'. When the lugs engage the bottom of the vertical leg, the cap is rotated anti-clockwise and the reducing depth of the horizontal leg of grooves 40' forces the lugs 38' radially inwardly. This radial displacement of the lugs is permitted by the elasticity of the insert portion 32' and when the lugs overide the end of the horizontal leg of grooves 40' and enter the recesses 56, there is a snap engaging action caused by the elasticity of the material. When the lugs 38' are engaged in the recesses 56, the cover 30' is locked in place and cannot be accidentally removed or readily removed by vandals or other people.

Figure 7:
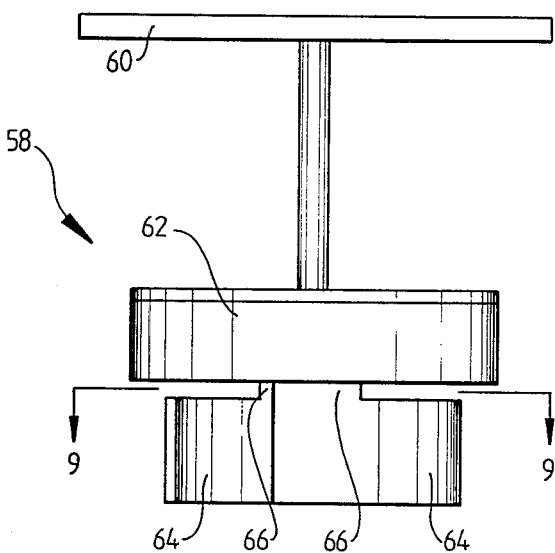
FIG. 7 is a side view of a key for use with the cover of FIGS. 4 to 6.
Figure 8:
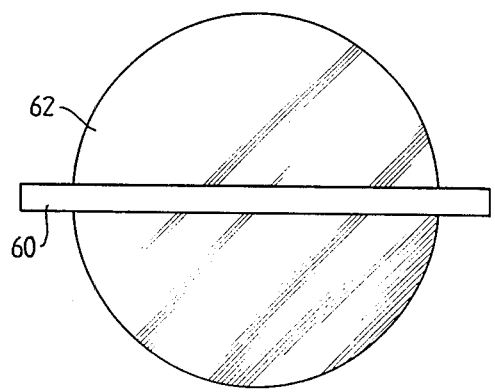
FIG. 8 is a plan view of the key of FIG. 7.
Figure 9:
FIG. 9 is a sectional view on line 9—9 of FIG. 7.
Figure 9:
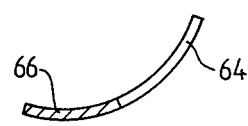

A key 58 shown in FIGS. 7 to 9 is provided for the removal of the cover 30' from the cylindrical body 12'. The key 58 has a handle 60 projecting upwardly from a body 62 with a pair of arcuate opposed skirt portions 64 depending from the body 62 and connected thereto by way of reduced length arcuate membranes 66. The curvature of the skirt portions 64 and of the membranes 66 is the same and the skirt portions 64 extend anti-clockwise, when viewed from above, from the membranes 66.

Cap 30' has a pair of arcuate slots 68 extending through the disc portion 34', the slots 68 corresponding to respective skirt portions 64. Disposed on the interior surface of the insert portion 32' of the cover 30' are blocks 70 having curved grooves 72 therein which are open at each end and at the upper side. The grooves 72 have one end aligned with the end of a respective slot 68 and the opposite end terminating adjacent a respective one of the lugs 38', with the radial location of the one end of each groove 72 being the same as that of the associated slot 68. However, the other end of each groove 72 is located radially outwardly relative to the one end. Thus, when the key skirt portions 64 are passed through the slots 68 and the key twisted to engage the skirt portions with the slots 72, the lugs 38' are drawn inwardly with the adjacent periphery of the insert portion of the cover when the skirt portions 64 of the key are aligned with the lugs 38'. This action disengages the lugs 38' from the recesses 56 permitting the cover to be rotated clockwise and to thereby be withdrawn from the cylindrical body 16'. The key may be formed in suitable metal or plastics material.

It will be appreciated that many modifications and variations may be made to the drip emitter assembly and or to the housing of the present invention which do not substantially effect the working of the invention, and all such modifications and variations should be considered within the scope of the present invention. In particular, it will be appreciated that the embodiment of locking cap and associated features disclosed herein is merely exemplary and many alternative constructions are available.

We claim:

1. A housing for use with a drip emitter and adapter to be disposed underground, said housing comprising a tubular body defining a hollow interior capable of receiving a drip emitter, the tubular body being open at one end to provide access to the hollow interior and said hollow interior having an end remote from said one end of the body defined by a wall, a multitude of openings from the hollow interior through at least the wall of such a size as to restrict ingress of exterior matter to the hollow interior when the housing is disposed underground and to allow egress from the hollow interior of water emitted by the drip emitter, the tubular body having on its exterior surface at a position remote from said one end generally transversely outwardly extending flange means to stabilize the housing when it is disposed underground, and the housing including a removable cover engageable with the tubular body at said one end for selectively closing said one end, said cover being provided with means to support the drip emitter within the hollow at a position remote from said wall.

2. A housing according to claim 1 wherein slots are provided in the tubular body adjacent said wall of the hollow interior.

3. A housing according to claim 1 wherein at least one buttress is provided between the flange means and the tubular body.

4. A drip emitter assembly comprising a housing adapted to be disposed underground, said housing comprising a tubular body defining a hollow interior capable of receiving a drip emitter, the tubular body being open at one end to provide access to the hollow interior and said hollow interior having an end remote from said one end of the body defined by a wall having a multitude of openings from the hollow interior through at least the wall of such a size as to restrict ingress of exterior matter to the hollow interior when the housing is disposed underground and to allow egress from the hollow interior of water emitted by the drip emitter, the tubular body having on its exterior surface at a position remote from said one end generally transversely outwardly extending flange means to stabilize the housing when it is disposed underground, the housing include a removable cover engageable with the tubular body at said one end for selectively closing said one end, a drip emitter disposed within, the hollow interior and a water supply line communicating with the drip emitter and adapted for connection to a source of water, wherein the water supply line defines a self-supporting coil capable of supporting the drip emitter remote from the wall of the hollow interior.

5. The drip emitter assembly of claim 1, wherein slots are provided in the tubular body adjacent said wall of the hollow interior.

6. The drip emitter assembly of claim 4, wherein at least one buttress is provided between the flange means and the tubular body.

* * * * *